US010225856B2

(12) United States Patent
Kahtava et al.

(10) Patent No.: US 10,225,856 B2
(45) Date of Patent: Mar. 5, 2019

(54) APPARATUS, METHOD AND COMPUTER PROGRAM PRODUCT PROVIDING PARTITIONED DOWNLINK SHARED CONTROL CHANNEL HAVING FIXED AND VARIABLE COMPONENT PARTS

(75) Inventors: Jussi Kahtava, Tokyo-to (JP); Mika Rinne, Espoo (FI); Olav Tirkkonen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 2095 days.

(21) Appl. No.: 11/801,965

(22) Filed: May 11, 2007

(65) Prior Publication Data

US 2007/0265016 A1 Nov. 15, 2007

Related U.S. Application Data

(60) Provisional application No. 60/799,920, filed on May 12, 2006.

(51) Int. Cl.
*H04W 72/14* (2009.01)
*H04W 72/12* (2009.01)
(Continued)

(52) U.S. Cl.
CPC ......... *H04W 72/1273* (2013.01); *H04L 1/003* (2013.01); *H04L 1/007* (2013.01);
(Continued)

(58) Field of Classification Search
CPC ... H04L 1/0003; H04L 1/0009; H04L 1/0025; H04L 1/003; H04L 1/007; H04W 72/1273; H04W 72/14
(Continued)

(56) References Cited

U.S. PATENT DOCUMENTS

| 6,847,678 B2 * | 1/2005 | Berezdivin et al. .......... 375/146 |
| 2003/0039217 A1 * | 2/2003 | Seo et al. ...................... 370/318 |

(Continued)

FOREIGN PATENT DOCUMENTS

| EP | 1351538 A1 | 10/2003 |
| EP | 1410517 A2 | 4/2004 |

(Continued)

OTHER PUBLICATIONS

Motorola, "U-UTR Downlink Control Channel Design and TP", 3Gpp TSG RAN1#43, Nov. 2005.*

(Continued)

*Primary Examiner* — Qun Shen
(74) *Attorney, Agent, or Firm* — Harrington & Smith

(57) ABSTRACT

Resources are allocated on a shared downlink control channel by an allocation table that is partitioned into a first, fixed length partition and into at least one second, variable length partition. The fixed length and the modulation and coding scheme MCS of the first partition is known a priori. The second variable length and the MCS of the second partition may be given in the first partition. Robustness may be varied between different second partitions of the same allocation table, or even within a single second partition to account for users at different proximity to the network node giving the allocations. Users may be identified in the first partition (e.g., a fixed number of users), and/or in the second partition (either additional allocated users or all users being allocated if the first partition does not identify users). Method, apparatus, computer program, integrated circuit and systems are detailed.

48 Claims, 7 Drawing Sheets

(51) Int. Cl.
*H04L 1/08* (2006.01)
*H04L 1/00* (2006.01)

(52) U.S. Cl.
CPC .......... *H04L 1/0025* (2013.01); *H04L 1/0073* (2013.01); *H04L 1/0075* (2013.01); *H04L 1/08* (2013.01); *H04L 1/0003* (2013.01); *H04L 1/0009* (2013.01); *H04W 72/14* (2013.01)

(58) Field of Classification Search
USPC .................................................. 370/329, 208
See application file for complete search history.

(56) References Cited

U.S. PATENT DOCUMENTS

| | | | |
|---|---|---|---|
| 2005/0107036 A1* | 5/2005 | Song et al. ...................... | 455/23 |
| 2006/0013181 A1* | 1/2006 | Stolpman et al. ............ | 370/342 |
| 2006/0116080 A1* | 6/2006 | Eom ................................ | 455/62 |
| 2006/0209734 A1* | 9/2006 | Son .......................... | H04L 47/10 370/312 |
| 2007/0160083 A1* | 7/2007 | Un ........................ | H04L 1/0042 370/470 |
| 2007/0171864 A1* | 7/2007 | Zhang et al. ................. | 370/329 |
| 2007/0218889 A1* | 9/2007 | Zhang .................. | H04W 68/00 455/422.1 |

FOREIGN PATENT DOCUMENTS

| | | |
|---|---|---|
| EP | 1427245 A2 * | 6/2004 |
| EP | 1427245 A2 | 6/2004 |
| JP | 2002/135273 A | 5/2002 |
| JP | 2011/243581 A | 12/2011 |
| WO | WO-03/001681 A2 | 1/2003 |
| WO | WO-2005/050875 A1 | 6/2005 |

OTHER PUBLICATIONS

Ericsson, "E-UTRA Downlink Control Signaling—Overhead Assessment", TSG-RAN WG1 #44, Feb. 2006.*
Kwon et al., "Design and Implementation of a Simulator Based on a Cross-Layer Protocol between MAC and PHY Layers in a WiBro Compatible IEEE 802.16e OFDMA System" IEEE Communications Magazine, Dec. 2005, pp. 136-146.*
3GPP TSG RAN1#44 Denver, USA, Feb. 13-17, 2006, "E-UTRA Downlink Control Channel Structure and TP", R1-060378.
TSG-RAN WG1 #45, R1-061365, Shanghai, China , May 8-12, 2006, "E-UTRA Downlink Control Signaling—Open Issue".
"Soft Frequency Reuse Scheme for UTRAN LTE", 3GPP TSG RAN WG1 Meeting #41, May 2005, 6 pgs.
"Downlink signaling for UTRA LTE", Nokia, 3GPP TSG-RAN WG1 Meeting #44bis, R1-060803, Mar. 2006, 4 pgs.
Rhode & Schwarz, "WiMAX General Information About the Standard 802.16", (2006), (34 pages).
Wen-bin Lin, Communication SOC Lab, "IEEE 802.16 OFDMA PHY", (Jul. 19, 2006), (64 pages).
IEEE Std 802.16 2004, Revision of IEEE Std 802.16-2001, 802.16, IEEE Standard for Local and Metropolitan Area Networks, Part 16: Air Interface for Fixed Broadband Wireless Access Systems, IEEE Computer Society and the IEEE Microwave Theory and Techniques Society, (Oct. 1, 2004), (895 pages).
"DL L1/L2 control signaling channel encoding structures", Nokia, 3GPP-RAN WG1 LTE AdHoc, R1-061907, Jun. 2006, 8 pgs.
3GPP TSG RAN WG1#45; R1-061433; Shanghai, China, May 8-12, 2006; Source: Texas Instruments; Title: Shared Control Channel Structure for E-UTRA Downlink; Agenda Item: 11.1.1; Document for: Discussion and Decision (5 pages).
3GPP TSG-RAN WG1 Meeting #4 R1-060301 (Original R1-060032); Denver, USA, Feb. 13-17, 2006; Source: NTT DoCoMo, Ericsson, Fujitsu, Mitsubishi Electric, NEC, Panasonic, Sharp, Toshiba Corporation; Title: L1/L2 Control Channel Structure for E-UTRA Downlink; Agenda Item: 13.1.3; Document for: Discussion and Decision (9 pages).

* cited by examiner

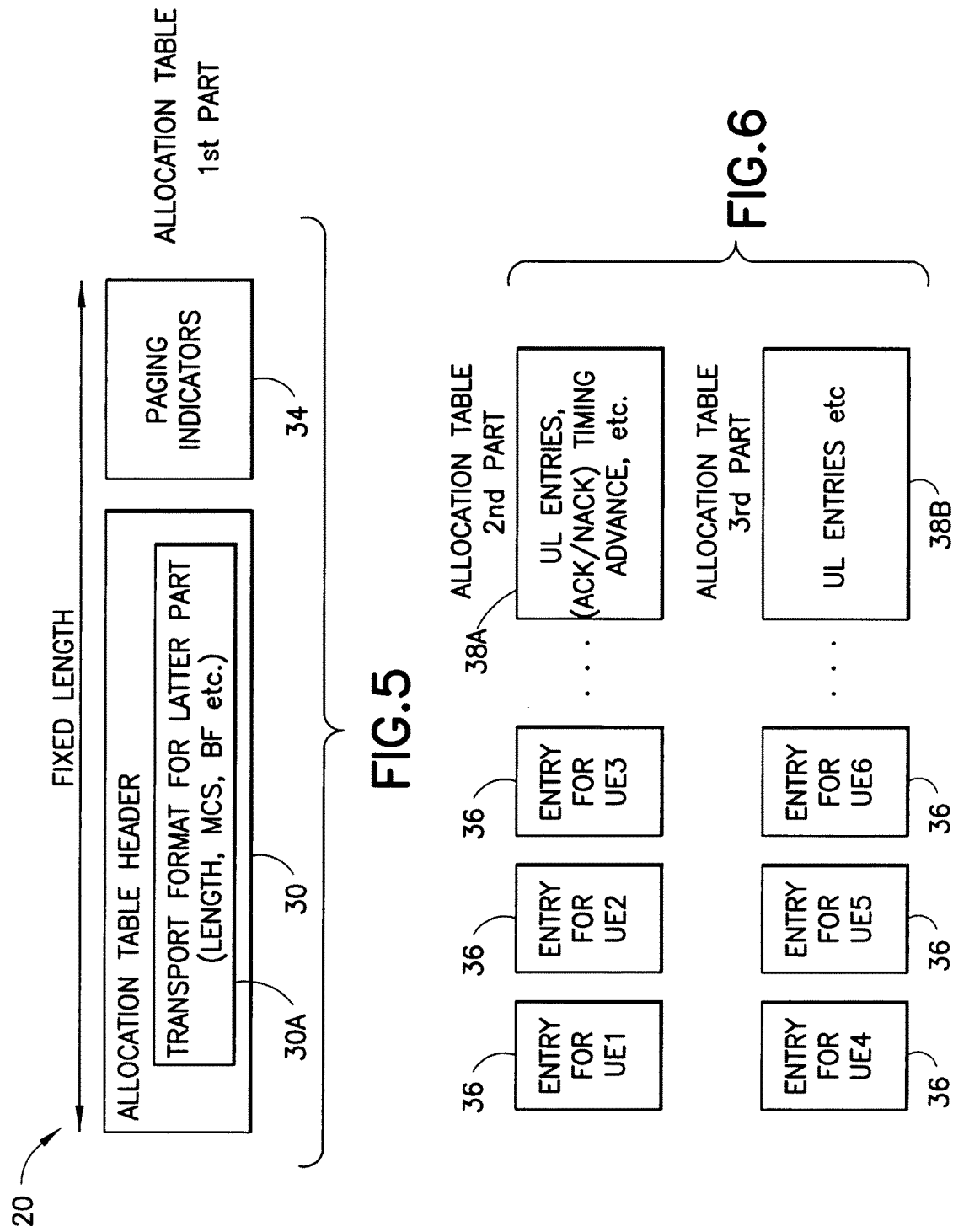

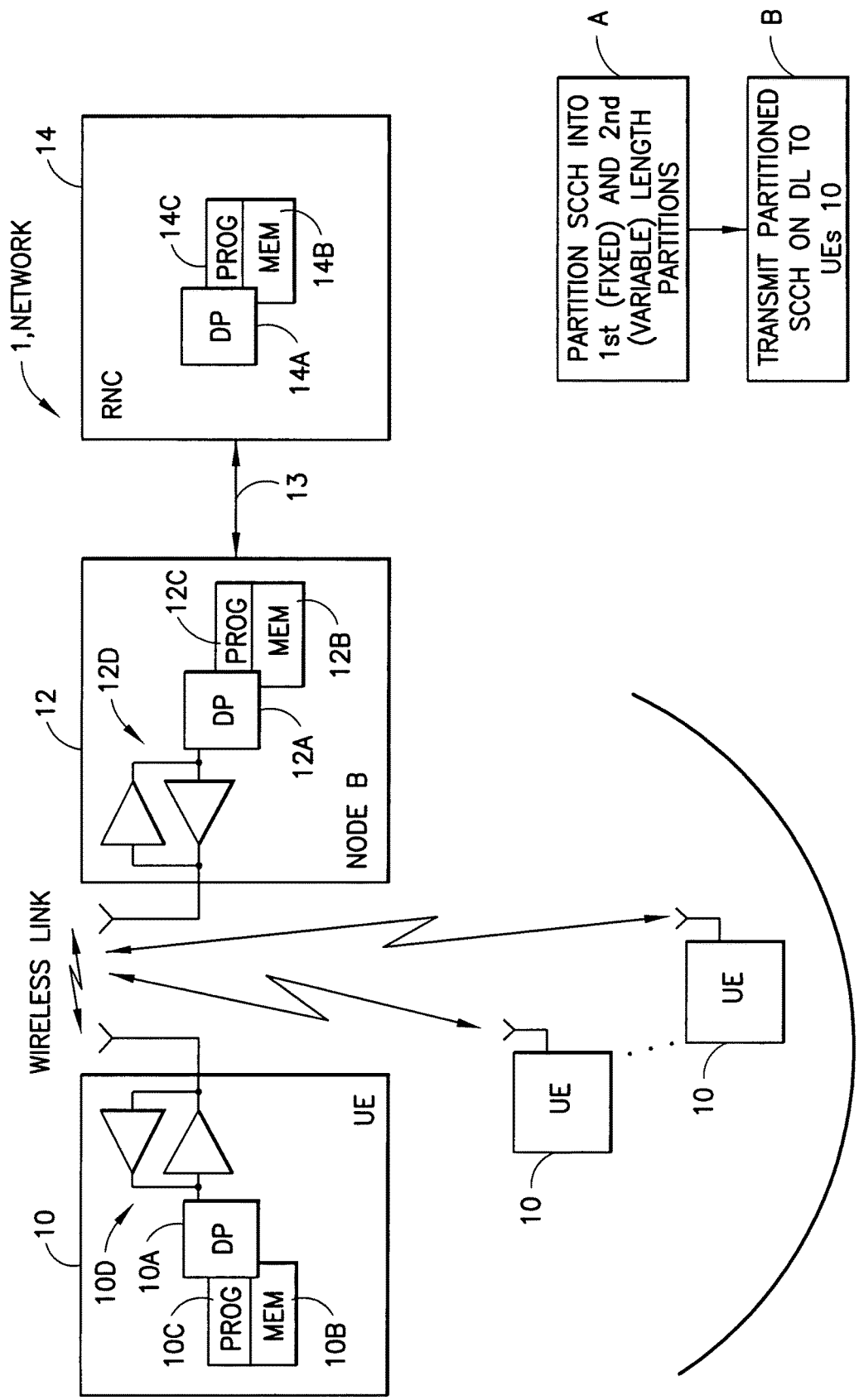

APPARATUS, METHOD AND COMPUTER PROGRAM PRODUCT PROVIDING PARTITIONED DOWNLINK SHARED CONTROL CHANNEL HAVING FIXED AND VARIABLE COMPONENT PARTS

CROSS REFERENCE TO RELATED APPLICATION

This application claims priority to U.S. Provisional Patent Application No. 60/799,920, filed on May 12, 2006 and hereby incorporated by reference in its entirety, including exhibits.

TECHNICAL FIELD

The exemplary and non-limiting embodiments of this invention relate generally to wireless communications systems, methods, computer program products and devices and, more specifically, relate to techniques for downlink signaling between a network node and user equipment.

BACKGROUND

The following abbreviations are herewith defined:

| | |
|---|---|
| 3GPP | third generation partnership project |
| AT | allocation table |
| C_RNTI | cell radio network temporary identifier |
| DL | downlink (node B to UE) |
| FECC | forward error correction code |
| HO | hand over |
| HS | high speed |
| HSDPA | high speed data packet access |
| L1 | layer 1, physical (PHY) layer |
| LTE | long term evolution |
| MCS | modulation coding scheme |
| Node B | base station |
| OFDM | orthogonal frequency division multiplex |
| PSK | phase shift keying |
| PTCCH | packet timing advance control channel |
| QAM | quadrature amplitude modulation |
| RLID | radio link identifier |
| RNC | radio network control |
| RRC | radio resource control |
| SCCH | shared control channel |
| SFR | soft frequency reuse |
| STBC | space-time block coding |
| TA | timing advance |
| UE | user equipment |
| UL | uplink (UE to Node B) |
| UMTS | universal mobile telecommunications system |
| UTRAN | UMTS terrestrial radio access network |
| E-UTRAN | evolved UTRAN, also referred to as UTRAN-LTE and as 3.9G |
| WCDMA | wideband code division multiple access |

Embodiments of a unified entry format for common control signaling are described in commonly owned U.S. patent application Ser. No. 11/509,697 and entitled "UNIFIED ENTRY FORMAT FOR COMMON CONTROL SIGNALLING", which is incorporated by reference herein in its entirety. This commonly owned patent application relates to resource allocation for beyond 3G systems, E-UTRA air interface technology, and more particularly to the structure of an Allocation Table (AT), also known as a shared signaling channel, shared control channel (SCCH) or similar. The AT provides a means delivering SCCH information to all UEs within a cell.

In the E-UTRA system the base station (eNodeB) in the network side allocates the radio resources for both DL and UL, and indicates the allocations to the UE on the downlink SCCH. The SCCH carries other information common to all receiving UEs such as, but not limited to, paging indicators and Random Access response. Additional information, such as acknowledgements of the previously transmitted uplink packets for UL traffic and transport formats for the allocated resources, is also present on the SCCH.

The resource allocation entry for a given UE has a predefined structure (unified entry format). However, the number of UEs that are allocated resources in the DL and the UL can vary from sub-frame to sub-frame, and thus the number of entries in the resource AT may not be constant. Consequently, the amount of control signaling transmitted in any given sub-frame in the downlink can differ from sub-frame to sub-frame.

The use of HSDPA HS-SCCH, i.e., UE-specific control signaling, would introduce undesirable overhead due to tail bits from the encoding blocks and bit-field reservations for ACK/NACK signaling. In E-UTRA, contrary to the HSDPA, UL resource allocations are also transmitted in the DL SCCH. Additionally, other UL allocation related control information, such as Power Control and Timing Advance, may be transmitted in the DL SCCH. Further, there are certain specific bit-fields that may be present, such as Paging indicators, which are shared by two or more UEs, and Random Access response, which are shared among random UEs attempting random access to the network. Thus, the use of a UE-specific signaling scheme is not desirable. On the contrary, it is favorable from the overhead and processing point of view to signal to several UEs in the same block and to jointly encode the control signals of multiple UEs respectively.

In joint encoding of the downlink shared control signal, multiple instances of control data (signaling bit-fields) are combined into a single block that is encoded with a FECC. However, as the encoded block length of the control signaling field is dependent on multiple sources of control data, the length of the field can be variable as was noted above, and a UE that is decoding the SCCH requires knowledge of the length of the encoded block. One possibility is to decode blindly, but the number of possibilities is so large that this scheme would not be feasible. Alternatively, the UE could be informed of the length of the encoded field by higher layer signaling. However, it can be shown that this approach would be too slow and inflexible for L1 signaling purposes. Such a scheme would actually limit the performance and increase the latency of the L1 processing.

Uniform encoding and modulation of the DL SCCH provides the lowest encoding overhead, but it exhibits certain drawbacks. As all the UEs in the cell area must be able to detect and decode the SCCH, the channel coding rate needs to be defined for the most difficult reception conditions, and the coding rate is required to be sufficiently low to provide for adequate decoding quality, even at the cell edge. In practice, the encoding rate may need to be set so low that the SCCH overhead of the total DL capacity becomes unsustainable.

SUMMARY

In accordance with one aspect of the invention is a method that includes, for each of multiple resource allocations, partitioning an allocation table into a first, fixed length partition and into at least one second, variable length partition. The partitioned allocation tables are transmitted on a downlink shared control channel to a population of users. A transport format at least for the first partition of the allocation tables is known a priori by the population of users.

In accordance with another aspect of the invention is a memory that includes computer instructions directed toward allocating resources to a population of users. When executed by a processor, the instructions cause actions that include, for each of multiple resource allocations by a network node, partitioning an allocation table into a first, fixed length partition and into at least one second, variable length partition. The actions further include transmitting the partitioned allocation tables from the network node on a downlink shared control channel to a population of users. A transport format at least for the first partition of the allocation tables is known a priori by the population of users.

In accordance with another aspect of the invention is a network device that includes a processor coupled to a memory and a transmitter. The processor is adapted, for each of multiple resource allocations by the network device, to partition an allocation table into a first, fixed length partition and into at least one second, variable length partition. The transmitter is adapted to transmit the partitioned allocation tables from the network device on a downlink shared control channel to a population of users. A transport format at least for the first partition of the allocation tables is known a priori by the population of users.

In accordance with yet another aspect of the invention is an integrated circuit that includes first and second circuitry. The first circuitry is adapted, for each of multiple resource allocations by a network node, to partition an allocation table into a first, fixed length partition and into at least one second, variable length partition. The second circuitry is adapted to transmit the partitioned allocation tables from the network node on a downlink shared control channel to a population of users.

In accordance with yet another aspect of the invention is a portable wireless device that includes a receiver and a processor coupled to a memory. The receiver is adapted to receive a partitioned allocation table. The processor is adapted to processes a fixed length first partition of the allocation table in a known channel coding block and to process at least one variable length second partition of the allocation table to determine that the variable length second partition is correctly received and to determine from the allocation table that an allocation of resources to the device is completely received.

In yet another embodiment, the invention is a system that includes a network node and a portable wireless device. The network node is configured, for each of multiple resource allocations by the network node, to partition an allocation table into a first, fixed length partition and into at least one second, variable length partition; and to transmit the partitioned allocation tables from the network node on a downlink shared control channel to a population of users. The portable wireless device is configured to receive the allocation table on the downlink shared control channel and to processes the fixed length first partition of the allocation table in a known channel coding block and to process the at least one variable length second partition of the allocation table to determine that the variable length second partition is correctly received and to determine from the allocation table that an allocation of resources to the device is completely received.

These and other exemplary embodiments are detailed further below.

BRIEF DESCRIPTION OF THE DRAWINGS

Embodiments of the invention are detailed below with reference to the attached Drawing Figures.

FIG. 5 presents the first, fixed part of the DL SCCH channel with common information (e.g. pure paging indicators).

FIG. 6 shows the latter part of DL SCCH channel with two parts, where one part is provided with a more robust encoding and modulation scheme than the other.

FIG. 9 shows a simplified block diagram of various electronic devices that are suitable for use in practicing the exemplary embodiments of this invention.

FIG. 10 is a logic flow diagram that is descriptive of a method in accordance with the exemplary embodiments of this invention.

DETAILED DESCRIPTION

Figure 1:
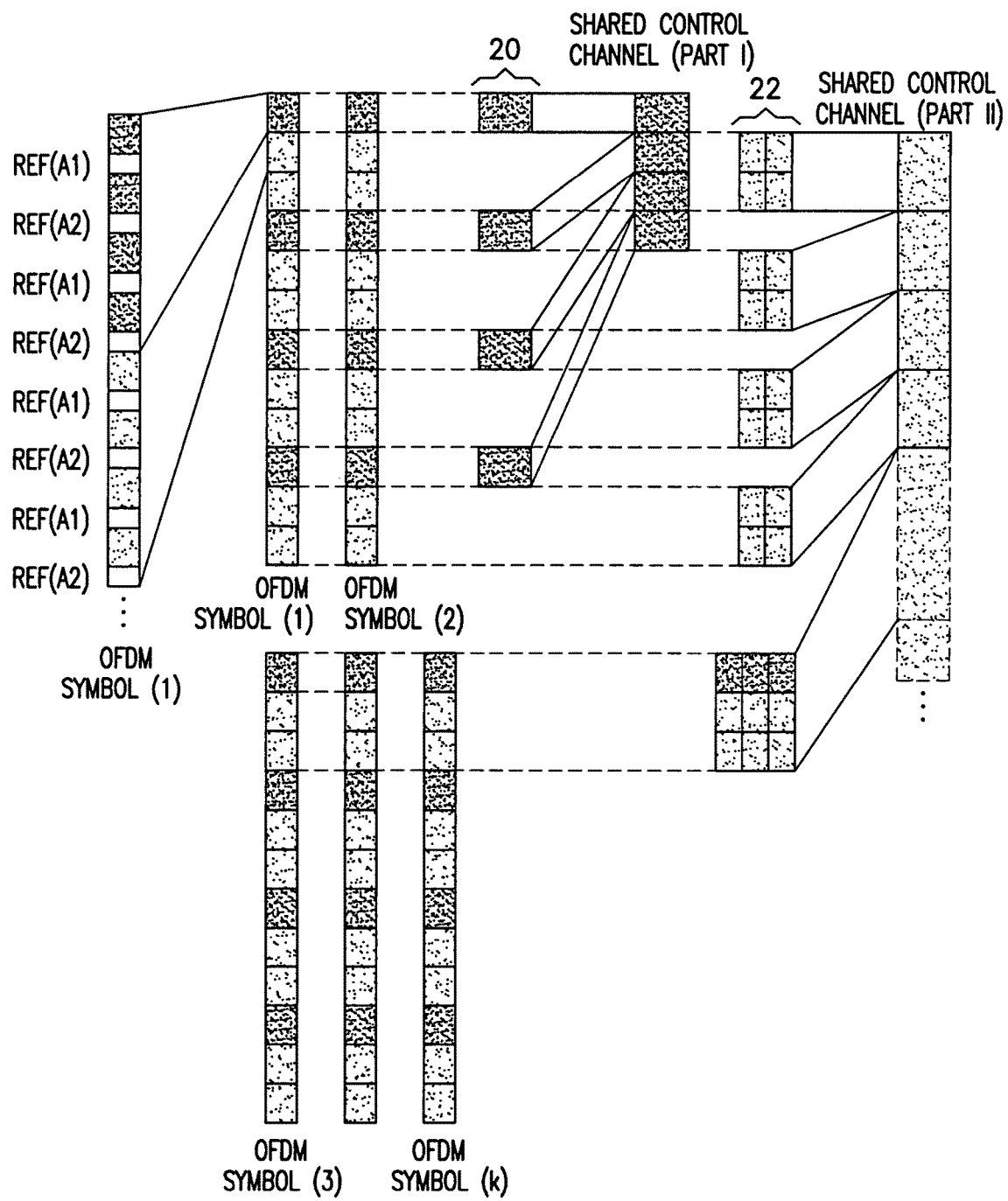
FIG. 1 depicts splitting or partitioning the DL SCCH into two blocks when soft frequency reuse is employed.

The exemplary embodiments of this invention relate at least in part to the physical structure of the DL shared control signal, and in particular to the partitioning of the control channel into separately encoded fields.

The use of the exemplary embodiments of this invention overcomes the problems discussed above. For example, in WCDMA HSDPA signaling each UE detects one channelization code from a number of HS-SCCH channelization codes available in the DL and, thus, the HS-SCCH is always of a fixed length channel coding block as the control signal is fixed, defined for and specific to a single UE at a time. Control signaling that is jointly encoded for multiple UEs has not been used in WCDMA.

The exemplary embodiments of this invention relate to and are described below in the context of UTRAN-LTE. More specifically, the exemplary embodiments of this invention address the area of signaling resource allocations and control of UEs for the downlink reception and uplink transmission by the DL signaling channel. This implies that the base station node is responsible for the resource allocation and control for both link directions. However, it should be appreciated that at least some aspects of the exemplary embodiments are applicable to other types of wireless communication systems. In general, it may be possible that the communicating nodes are equal types of devices, however only one of the devices is assigned the responsibility of playing a dominant role in defining the resource reservations in the air interface.

Reference is made first to FIG. 9 for illustrating a simplified block diagram of various electronic devices that are suitable for use in practicing the exemplary embodiments of this invention. In FIG. 9 a wireless network 1 is adapted for communication with a UE 10 via a Node B (base station) 12, also referred to at times as an eNodeB. The network 1 may include a RNC 14, or more generally some serving controlling node, which may be referred to as a serving RNC (SRNC), or as a packet radio serving node (eGSN), or more generally as a "node". The UE 10 includes a data processor (DP) 10A, a memory (MEM) 10B that stores a program (PROG) 10C, and a suitable radio frequency (RF) transceiver 10D for bidirectional wireless communications with the Node B 12, which also includes a DP 12A, a MEM 12B that stores a PROG 12C, and a suitable RF transceiver 12D. The Node B 12 is coupled via a data path 13 to the node 14 that also includes a DP 14A and a MEM 14B storing an associated PROG 14C.

In a typical case, there will be a population of UEs 10 located within a cell served by the Node B 12. The UEs will typically experience different dynamic conditions of signal-to-interference ratio (SIR) for reception, and especially so for one or more of the UEs 10 that may be located at or near the "edge" of the cell.

As will be described below, at least the PROGs 10C and 12C include program instructions that, when executed by the associated DP, enable the electronic device to operate in accordance with the exemplary embodiments of this invention. For example, the PROG 12C includes program instructions that direct the Node B 12 to signal the UE 10, and other UEs in the same cell, using a partitioned and separately encoded DL SCCH, and the PROG 10C includes program instructions that direct the UE 10 to receive the DL SCCH and to selectively decode the various partitions of that same DL SCCH, as will be described in greater detail below.

Thus, the exemplary embodiments of this invention may be implemented at least in part by computer software executable by the DP 10A of the UE 10 and the other DPs, such as in cooperation with a DP in the network, or by hardware, or by a combination of software and/or firmware and hardware.

In general, the various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

Having thus introduced on suitable but non-limiting technical context for the practice of the exemplary embodiments of this invention, the exemplary embodiments will now be described with greater specificity with reference to FIGS. 1 through 8 and 10.

The exemplary embodiments of this invention provide a DL SCCH that is partitioned into at least two parts, and define how the DL SCCH is mapped to physical resources. The first partition of the DL SCCH is of fixed length in units of channel coded modulated symbols, and is located at a predetermined resource position of the DL physical shared channel sub-frame, with a-priori known modulation and channel encoding. The first partition comprises a header field that indicates the presence (or absence) of the latter partition (or latter partitions), as well as the resource location and structure of the latter partition(s), if present. The information on the physical structure of the latter partition may comprise the Transport Format in the form of channel coding and a modulation scheme, or at least as the length of the encoding field. The Transport Format may additionally comprise, as non-limiting examples, whether special multi-antenna processing techniques, such as beamforming and/or Space Time Block Code (STBC), Space Frequency Block Code (SFBC) or Cyclic Delay Diversity (CDD) are used. The channel coding and modulation scheme of the latter partition may be different from that of the first partition, and it may vary from sub-frame to sub-frame. It is also possible that the latter partition(s) are of a fixed Transport Format, and the first partition indicates the number of such latter partition(s).

A particular example of using different transmit powers in the context of the physical resource partitioning of the control channel is to take DL Soft Frequency Reuse (SFR) into consideration. For example, the first partition of the SCCH may use only the physical resources assigned high transmit power profiles. However, the exemplary embodiments of this invention are not limited by the use of SFR, and two or more of the partitions may occupy the physical resources assigned high transmit power profiles, if so desired.

The latter partition may comprise two or any number of separate fields, where one is provided with a more robust encoding and modulation scheme or a higher transmit power than the other. None of the partitions need to be limited to a given part of the sub-carriers in the case of SFR, and all may occupy even the sub-carriers of the high transmit power profiles.

Reference with regard to the concept of SFR may be had to, for example, a document entitled "Soft Frequency Reuse Scheme for UTRAN LTE", 3GPP TSG RAN WG1 Meeting #41, Athens, Greece, 9-13 May 2005, R1-050507, Source: Huawei. The SFR is a scheme applied in a multi-carrier, e.g. OFDM, system, where some portion of the frequency bandwidth (some sets of sub-carriers) are transmitted by higher power than the other portions of the frequency bandwidth (other sets of sub-carriers). This type of frequency domain power profiling changes the received signal-to-interference conditions, as a function of frequency, and allows gain. The SFR technique is also operable in an asynchronous wide area network, as the frequency plan is stable and does not require temporal coordination.

In accordance with the exemplary embodiments of this invention the pilot (reference or REF in FIGS. 1 and 2) symbols appear frequency multiplexed with the first partition of the SCCH. Thus, depending on the actual density and positions of the pilot symbols, the SCCH is given the fixed length of single OFDM symbol resources (or a SFR power profile fraction of it), excluding the sub-carriers carrying modulated pilot symbols. This implies that even if the pilot symbol density may be different in different cell areas, it does not change the a-priori knowledge that the UE 10 has of the first partition of the SCCH.

In one exemplary embodiment of the invention there are a fixed number (three in the example shown in FIG. 3) of DL UE allocations assigned to the first part of the AT, in addition to a paging indication field and the header field. All other DL allocations, UL allocations, ACK/NACK field and other shared control signaling are located in the second partition of the SCCH.

In another exemplary embodiment of the invention, the first, fixed length part of the DL SCCH only carries the header field and the paging indications. The latter partition is comprised of at least two fields of variable length, one of which may employ a lower encoding rate and a lower-order modulation scheme or a higher transmit power than the other. Both fields in the latter partition carry DL and UL resource allocations. In this embodiment the Node-B scheduler may allocate control signals intended for those UEs 10 that are located at or near the cell edge to the control signal field having the lower rate encoding and lower-order modulation schemes and/or higher transmit power, whereas those UEs 10 that are located nearer to the cell center have their allocations placed in the control signal field having the higher rate encoding and possibly even higher-order modulation scheme and/or lower transmit power.

As a non-limiting example, the first partition coding rate may be of an order ⅛ to ⅙ convolutional code, and the following partitions of the lower coding rate may be in the range of order ⅙ to ⅓ convolutional code, and the higher coding rate may be in the range of order ⅓ to ½ convolutional code. Turbo codes or concatenated codes are similarly available as alternatives, if so determined in the standard specification of the system in question. As a non-limiting example, the lower-order modulation scheme may use QPSK modulation, and the higher-order modulation scheme may use 8PSK, 16QAM, 64QAM, or any multi-antenna modulation.

Described now in further detail are the exemplary embodiments of this invention with reference to FIGS. 1-8.

FIG. 1 illustrates a technique in accordance with an exemplary embodiment of this invention to divide the SCCH into two partitions, that is, into two channel coding blocks (referred to as SCCH part I and SCCH part II). The first part (part I) is mapped to fixed Physical Resource Blocks 20 having a fixed, a-priori known modulation and coding. This a priori known modulation and coding format may be written into specification or it may informed in e.g. system information transmitted on a Broadcast Channel. The second part (part II) is mapped to a variable number of Physical Resource Blocks 22 with variable modulation and coding. The physical resources, modulation, coding, beamforming and so forth transport format parameters of the second part of the SCCH are described in the first part of the SCCH. This Figure assumes the use of SFR, and thus the first part of the SCCH uses physical resources of only the high transmit power profiles. The above-mentioned pilot (reference) symbols are shown interspersed (frequency or time-frequency multiplexed) among the OFDM symbols at the left of the Figure.

Figure 2:
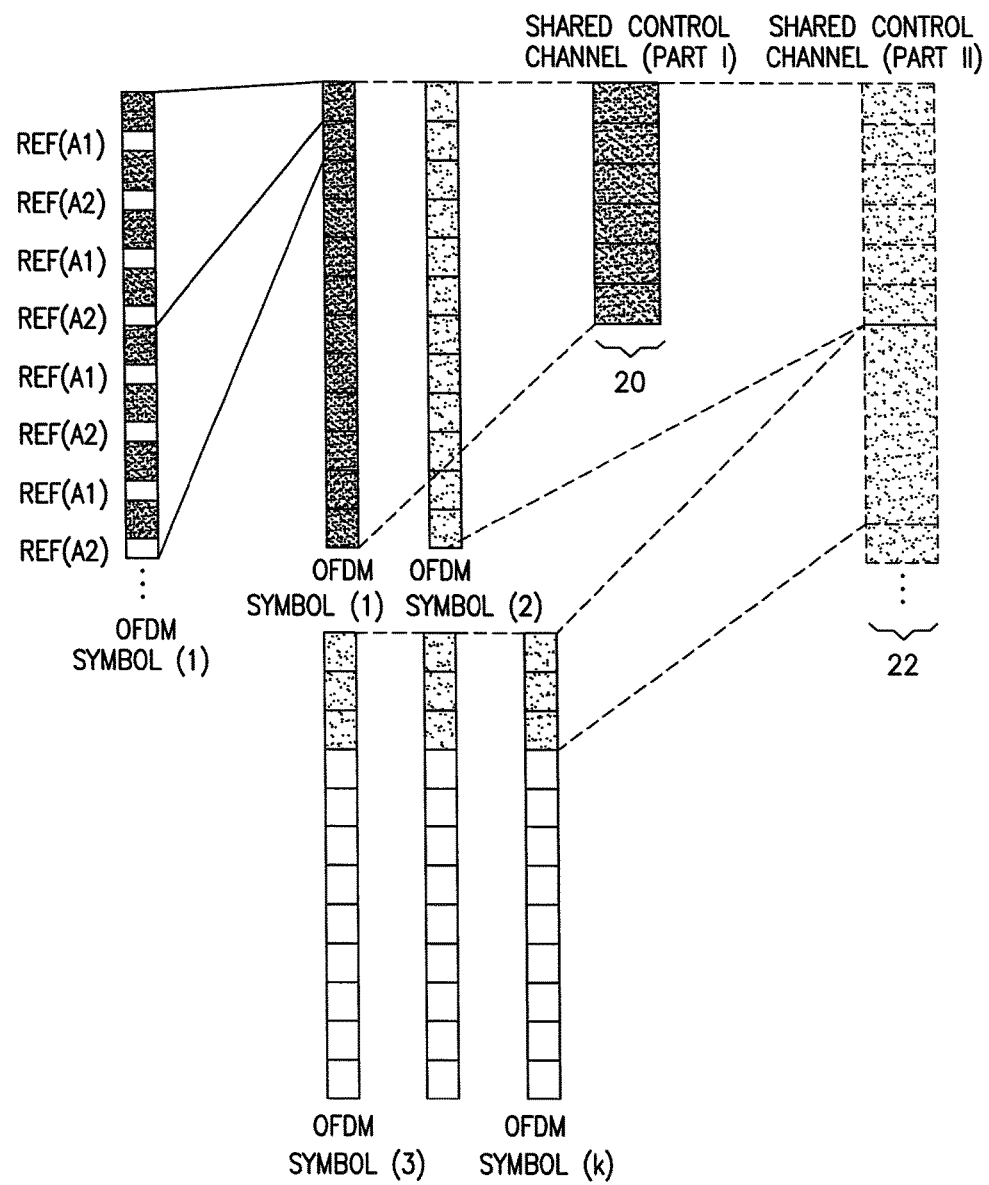
FIG. 2 depicts splitting the DL SCCH into two blocks when soft frequency reuse is not employed, or when its presence is omitted by the control channel design.

FIG. 2 illustrates a technique of mapping the control channel that does not use SFR, or that omits the existing SFR, in accordance with a further exemplary embodiment of this invention to divide the SCCH into two partitions, that is, into two channel coding blocks (again referred to as SCCH part I and SCCH part II). The first part (part I) is mapped to the fixed Physical Resource Blocks 20 having a fixed, a-priori known modulation and coding. The second part (part II) is mapped to the variable number of Physical Resource Blocks 22 with variable modulation and coding. The physical resources, modulation, coding, beamforming and so forth transport format parameters of the second part of the SCCH are described in the first part of the SCCH. Note that according to the scheme in FIG. 2, even if the SFR were in use, the first part of the SCCH omits it and uses fully the physical resources of the first OFDM symbol, though excluding the reference (pilot) symbols.

FIGS. 1 and 2 each make clear that the control channel, DL-SCCH, is divided into at least two parts 20, 22, each of which is distributed in frequency. This frequency distribution consists in an exemplary embodiment (e.g., OFDM) of distributed groups of subcarriers. So the partitions of the AT can be mapped to different sets of sub-carriers. The first partition is mapped to some portion of the frequency bandwidth that consists of a fixed number of physical resource blocks as above, each being a set of sub-carriers. To send the partitions adaptively, such as distinguishing among UEs at a cell edge versus those closer in, one of the partitions may be transmitted in one portion of the frequency bandwidth (over a first set of sub-carriers) at a higher power and another may be transmitted at another portion of the bandwidth (over a second set of sub-carriers) at a lower power.

Figure 3:
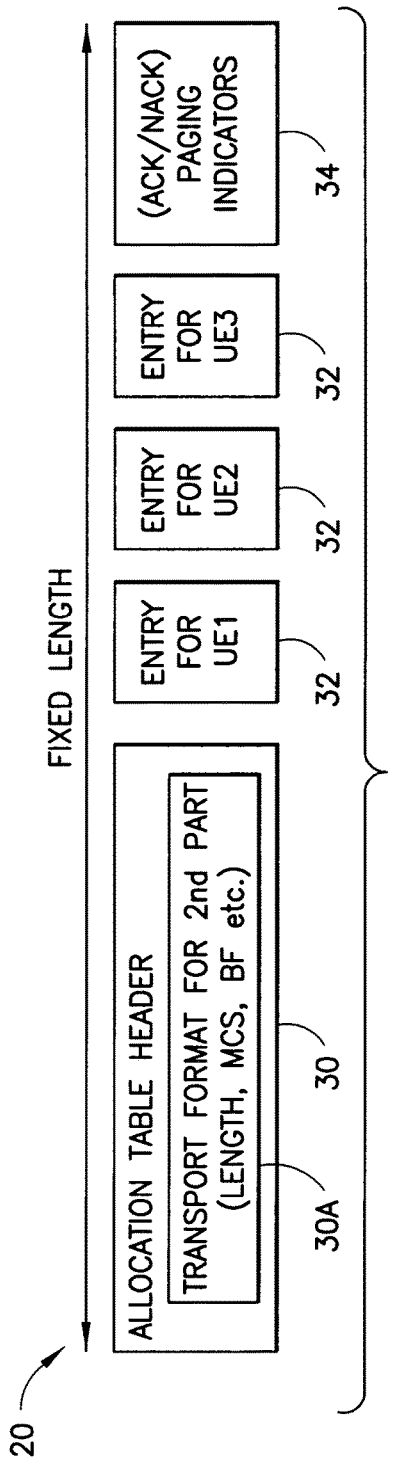
FIG. 3 illustrates a first, fixed part of the DL SCCH channel (containing exemplary DL UE resource allocations).

FIG. 3 shows in further detail an exemplary embodiment of the first, fixed partition 20 of the DL SCCH channel. In this non-limiting embodiment the first (fixed length) partition 20 includes an AT header 30 that includes information 30A for specifying the transport format for the second partition 22, such as length, MCS, beamforming, multi-antenna transmission scheme and so forth, that is needed by the UE 10 to receive and correctly decode the second partition 22. There may also be a plurality (e.g., a fixed number) of UE-specific allocation entries 32, and other further information 34 for specifying Paging indicators or the acknowledgements of the previous allocations.

Figure 4:
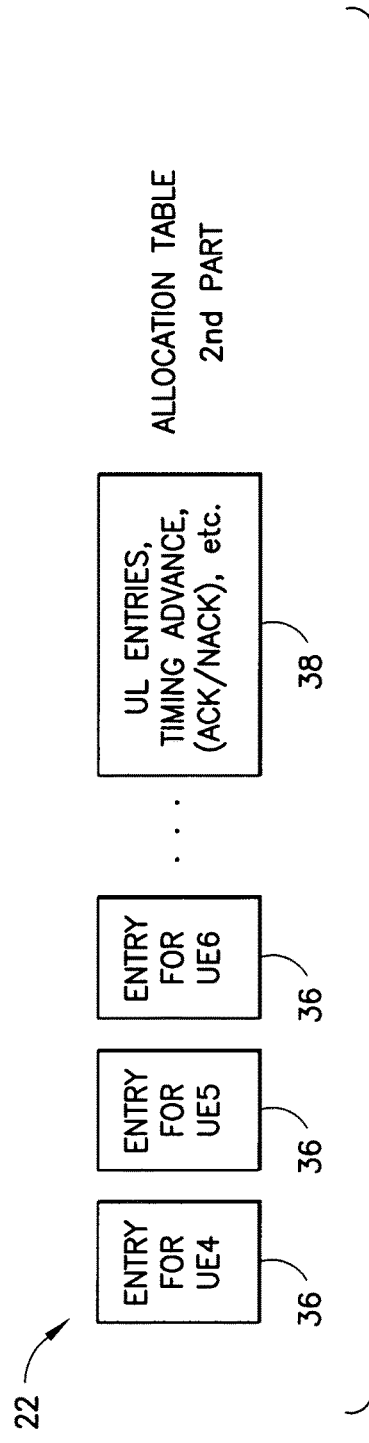
FIG. 4 illustrates a second, variable length part of the DL SCCH channel.

FIG. 4 shows in further detail the second, variable length partition 22 of the DL SCCH channel. In this case, there may also be a plurality of UE-specific allocation entries 36 (those not conveyed in the first partition 20), as well as information 38 providing the remaining portion of the Allocation Table, such as UL entries including (occasional) Power Control, Timing Advance, Acknowledgement information and so forth.

FIG. 5 shows another embodiment of the first (fixed) partition of the DL SCCH channel, in this case one that includes only the AT header 30 and the Paging indicators 34 (potentially also a RACH response), as in FIG. 3, but with no UE-specific entries 32. In this case all UE allocation entries would be carried in the second partition 22 (e.g., as in FIG. 8).

FIG. 6 illustrates an embodiment of the second partition 38 of the DL SCCH channel, where the second partition 38 is provided as two (or more) partitions 38A, 38B that are transmitted using different MCSs. For example, one MCS (such as the one for partition 38A) provides a less robust encoding and/or modulation scheme than the other. As was noted above, the more robust MCS may be used with those UEs 10 near the cell edge (UEs 1, 2, and 3 in this example), whereas the less robust MCS may be used for those UEs 10 nearer to the Node B 12 (UEs 4, 5 and 6 in this example).

Figure 7:
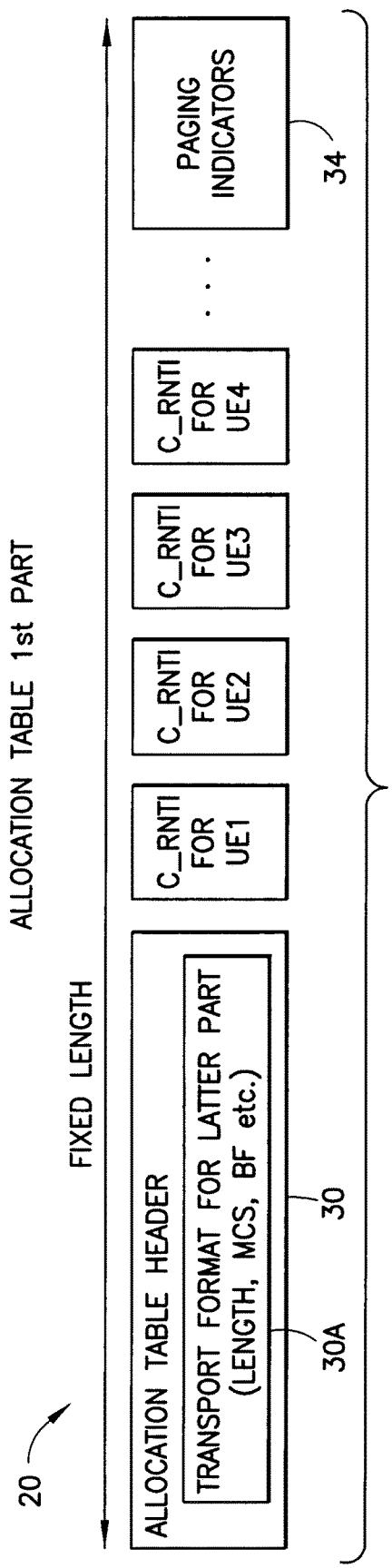
FIG. 7 illustrates the first part of the DL SCCH channel (with all UE IDs (C_RNTI) contained therein).

FIG. 7 shows another embodiment of the first (fixed) partition of the DL SCCH channel, in this case one that includes identifications, such as C_RNTIs, for those UEs 10 that have resource allocations in the second partition. This particular signaling structure is well suited for use on a wide bandwidth DL where first partition 20 has sufficient capacity to carry the required signaling.

The C_RNTI is a unique identifier of the UE 10 (terminal) in the scope of the serving base station (Node B 12). C_RNTI is applied, for example, to announce the resource allocations for the UE 10 to receive in DL (downlink scheduling information), and for making a resource reservation for the UE 10 to transmit in UL (uplink scheduling grant).

Figure 8:
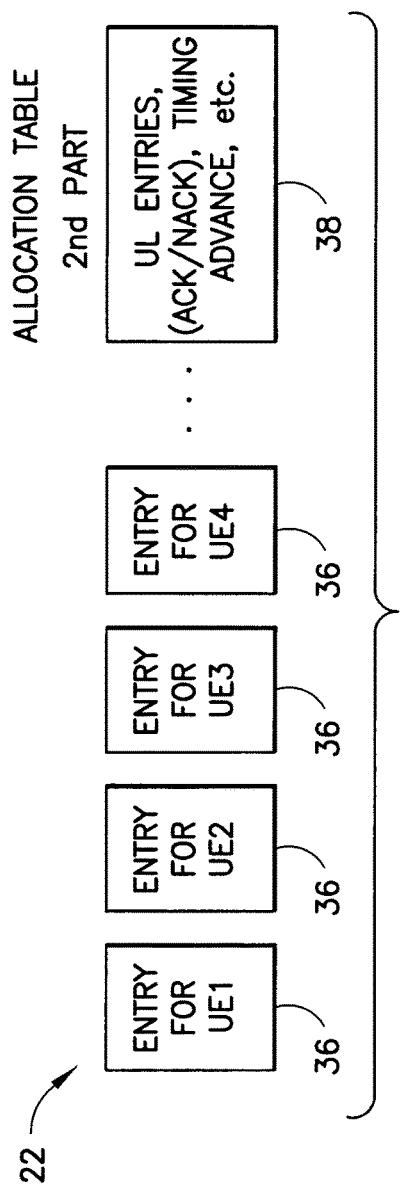
FIG. 8 depicts the latter part of the DL SCCH channel with UE entries (excluding C_RNTIs) and other content.

FIG. 8 illustrates a further embodiment of the second partition 38 of the DL SCCH channel, in this case one carrying all of the entries for UE 10 allocations.

It can be noted that as the signaling resource can be expected to be scarce, and the amount of bit-fields will be very efficiently designed, the C_RNTI signaling actually consumes most of the signaling capacity. Thus, the number of UEs 10 to signal during a Transmission Time Interval (typically one sub-frame, although sometimes more than one sub-frame) plays a significant role in the efficiency of packing the sub-frame, the efficiency of multi-user scheduling, and on the other hand of signaling overhead.

In accordance with a further exemplary embodiment of this invention, one that is applicable to any of the schemes discussed above, the C_RNTI may be signaled only once in a case where there is a downlink allocation and an uplink allocation for the same UE 10 in a given sub-frame. This implies that there are allocation entries including downlink-only entries, uplink-only entries and downlink-uplink entries. This is readily accommodated by adding, for example, a two-bit indicator of link direction, whether the allocation description applies for the downlink, for the uplink, or for both the uplink and the downlink. Alternatively, a bit field of fixed length may be added, which indicates the number of UL only entries and DL only entries. In the case, where the signaling entry indicates both a downlink and an uplink allocation, the entry format itself supports independent Transport Format fields for the downlink and uplink, respectively. The saving of bits due to lack of redundant C_RNTI signaling is still significant. In practice, it may often be the case that the allocation signaling entries are ordered so that the order itself is descriptive to some degree of the allocation. Thus, it would be appropriate to arrange the signaling, for example, so that the UL allocations appear first in a mutually ordered-list and the downlink allocations next in the mutually ordered-list. In this case, there is a need to include, as part of the UL allocation entry, also the related joint downlink signaling. This causes, however, the DL signaling to lose its place in the DL allocation ordered-list. The exemplary embodiments of this invention thus may include a simple mechanism to overcome this by including within the joint UL-DL signaling entry a pointer (index) to its position in the downlink ordered-list. This type of indexing of the signaling lists does not present a problem for any of the UEs 10, since all of the information is in any case included in the joint-coded block to be decoded by all the UEs 10. Any UE 10 thus just has to be capable of decoding the coding block and processing the signaling fields relevant to itself. Further regarding the ordering, it is possible that only the uplink allocation order (adjacent frequency blocks are allocated), as the ordered-list plays a role, and the downlink order (any flexible frequency blocks are allocated) does not have any role. If this is the situation, the index itself may be omitted and only the allocation link-direction indicator is provided.

The exemplary embodiments of this invention thus provide, and referring to FIG. 10, a method to transmit information to a population of UEs from a network node, such as a Node B, that comprises partitioning a DL SCCH channel into a first, fixed length partition (Step A) and into at least one second, variable length partition (Step A), and transmitting the partitioned SCCH on the DL to the UEs 10 (Step B).

The first partition is transmitted using a Transport Format that is known a-priori by the UEs for reception and decoding by the UEs, and comprises information for informing the population of UEs of a transport format, such as at least a length and MCS, of the at least one second partition for enabling the UEs to receive and decode the at least one second partition.

The second partition may further be nested to one or more channel coding blocks, where each of the former, potentially more robust coding blocks includes the Transport Format and resource signaling of the next, less robust channel coding block(s). The receiving UE 10 processes the nested channel coding blocks only to the level where it finds signaling relevant to it, and any of the following blocks in the nested structure need not be processed by the UE 10.

For a case where there are at least two second partitions, they may be transmitted using different Transport Formats, such as by using a more and a less robust MCS, and/or higher or lower transmit power.

In one embodiment of the invention, robustness can be further increased inside a partition for selected information elements, for example a C_RNTI, by utilizing additional outer coding such as repetition, block or convolutional coding, and/or by increasing the transmit power used for said information elements.

In an exemplary embodiment, the network node transmits an Allocation Table header, the Paging Indicators in the first partition, and a remainder of the AT in the at least one second partition, where the at least one second partition comprises, as non-limiting examples, individual UE entries, (occasional) Power Control and (occasional) Timing Advance. In an exemplary embodiment the first partition may also comprise at least one UE-specific entry.

The transport format of the at least one second partition, including the length, may vary from instance to instance of same, such as on a sub-frame basis.

The first partition, as received by a UE 10, may comprise a plurality of reference (pilot) symbols modulated to the sub-carriers of the OFDM symbols.

The partitioned DL SCCH channel in accordance with the exemplary embodiments of this invention may be used with SFR, or it may be used without SFR.

Figure 11:
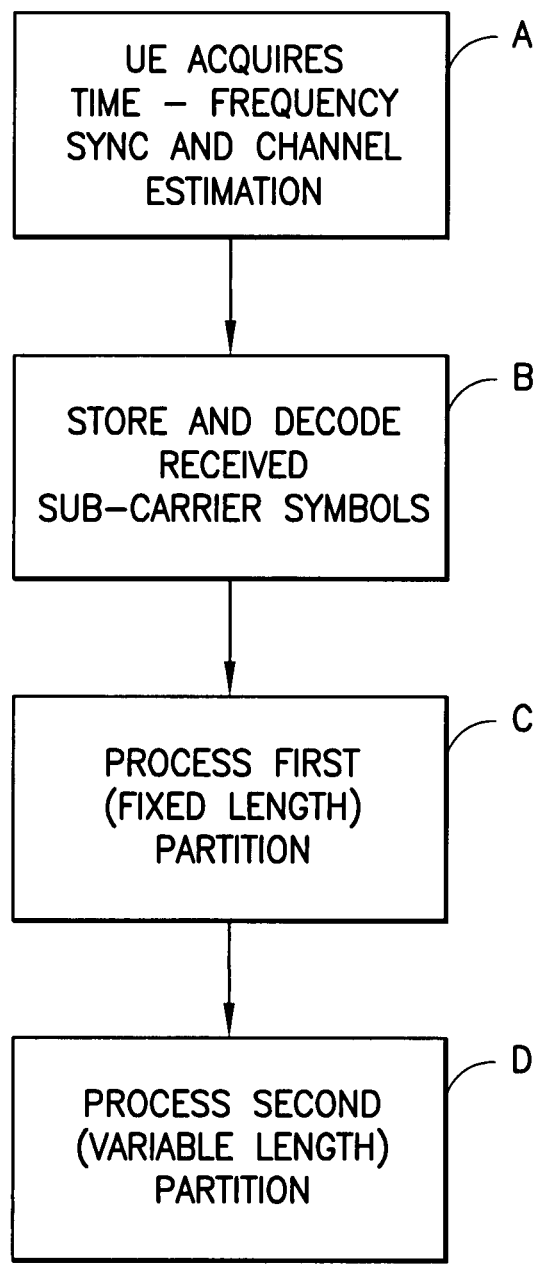
FIG. 11 is a logic flow diagram that is descriptive of a UE-executed method in accordance with the exemplary embodiments of this invention.

The exemplary embodiments of this invention thus also provide a UE 10 that is responsive to receiving and decoding the partitioned DL SCCH channel, as discussed above. More specifically, and referring to FIG. 11, the UE 10 acquires a time-frequency synchronization and channel estimation (Step A), stores and decodes the received sub-carrier symbols (Step B), processes the fixed part of the allocation partition in the a-priori known channel coding block (Step C) and processes the variable length partition of the allocation to the extent that is necessary in order to know that it is correctly received and to know that all relevant specific information for the UE 10 is completely received (Step D).

The exemplary embodiments of this invention thus also provide a node, such as the Node B 12, that is operable to format and transmit the partitioned DL SCCH channel, as discussed above.

The exemplary embodiments of this invention also provide computer program code, embodied at the network node, such as the Node-B 12, and at the UE 10, that is operable to format and transmit the partitioned DL SCCH channel, and to receive and decode the partitioned DL SCCH channel, respectively.

The circuitry used to provide the partitioned DL SCCH channel may be embodied in one or more integrated circuits or circuit modules installed in the network node and/or installed in the UE 10. Such an integrated circuit or module may comprise, for example, circuitry that is adapted to perform the steps as substantially shown in FIGS. 10-11, where each block of those figures represents circuitry of the integrated circuit or module.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, signal flow diagrams, flow charts and logic flow diagrams, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As was noted, embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
for each of multiple resource allocations by a network node, partitioning an allocation table into a first, fixed length partition and into at least one second, variable length partition;
transmitting the allocation table partitions from the network node to a population of users using a transport format at least for the first partition that is known a priori by the population of users, the transmitting the allocation table partitions comprising:
transmitting the first partition in a first plurality of non-contiguous sets of subcarriers in a first portion of a frequency bandwidth, the first portion comprising a fixed number of a set of non-contiguous sub-carriers, wherein the first partition is located at a predetermined time-frequency resource position known to the population of users of a physical shared channel sub-frame in which the allocation table partitions are transmitted, wherein the first partition contains no user equipment-specific entries and the first partition comprises information about a length of the at least one second partition; and
transmitting the at least one second partition in a second plurality of non-contiguous sets of subcarriers in a second portion of the frequency bandwidth, wherein the at least one second partition contains user equipment-specific entries.

2. The method of claim 1, wherein the first partition comprises information about resource location of the at least one second partition.

3. The method of claim 1, wherein the first partition comprises information about a modulation used in the at least one second partition.

4. The method of claim 1, wherein the first partition comprises information about coding used in the at least one second partition.

5. The method of claim 1, wherein for the case where the allocation table is partitioned into at least two second partitions, transmitting comprises:
transmitting the at least two second partitions using at least different transmit power.

6. The method of claim 1, wherein transmitting the allocation table partitions comprises transmitting different information elements of at least one of the partitions using at least different transmit power.

7. The method of claim 1, wherein transmitting the allocation table partitions comprises transmitting different information elements within at least one of the second partitions using different outer repetition coding.

8. The method of claim 1 wherein the first partition comprises an allocation table header that is needed by the users to receive and correctly decode the second partition.

9. The method of claim 1, wherein transmitting comprises transmitting the first partition at a power higher than a transmit power of any of the at least one second partitions of the allocation table.

10. The method of claim 1, wherein the allocation table further comprises a bit field of fixed length indicating a number of uplink only entries and a number of downlink only entries in the allocation table.

11. The method of claim 1, wherein transmitting comprises transmitting the first partition over the first plurality of non-contiguous sets of subcarriers at a first transmit power and transmitting the second partition over the second plurality of non-contiguous set of subcarriers at a second transmit power different from the first transmit power.

12. A computer program product comprising a non-transitory computer-readable medium bearing computer instructions directed toward allocating resources to a population of users, wherein a processor executing the instructions performs actions comprising:
for each of multiple resource allocations by a network node, partitioning an allocation table into a first, fixed length partition and into at least one second, variable length partition;
transmitting the allocation table partitions from the network node to a population of users using a transport format at least for the first partition that is known a priori by the population of users, the transmitting the allocation table partitions comprising:
transmitting the first partition in a first plurality of non-contiguous sets of subcarriers in a first portion of a frequency bandwidth, the first portion comprising a fixed number of a set of non-contiguous sub-carriers, wherein the first partition is located at a predetermined time-frequency resource position known to the population of users of a physical shared channel sub-frame in which the allocation table partitions are transmitted, wherein the first partition contains no user equipment-specific entries and the first partition comprises information about a length of the at least one second partition; and transmitting the at least one second partition in a second plurality of non-contiguous sets of subcarriers in a second portion of the frequency bandwidth, wherein the at least one second partition contains user equipment-specific entries.

13. The computer program product comprising computer instructions of claim 12, wherein the first partition comprises information about resource location of the at least one second partition.

14. The computer program product comprising computer instructions of claim 12, wherein the first partition comprises information about a modulation used in the at least one second partition.

15. The computer program product comprising computer instructions of claim 12, wherein the first partition comprises information about coding used in the at least one second partition.

16. The computer program product comprising computer instructions of claim 12, wherein the second partition comprises one or more channel coding blocks, each comprising resource signaling of user equipment specific entries.

17. The computer program product comprising computer instructions of claim 12, wherein for the case where the allocation table is partitioned into at least two second partitions, transmitting comprises:
transmitting the at least two second partitions using at least different transmit power.

18. The computer program product comprising computer instructions of claim 12, wherein transmitting the allocation table partitions comprises transmitting different information elements of at least one of the second partitions using different outer repetition coding.

19. The computer program product comprising computer instructions of claim 12, wherein transmitting comprises transmitting the first partition at a power higher than a transmit power of any of the at least one second partitions of the allocation table.

20. An apparatus comprising:
a processor adapted, for each of multiple resource allocations, to partition an allocation table into a first, fixed length partition and into at least one second, variable length partition
a transmitter adapted to transmit the allocation table partitions to a population of users using a transport format at least for the first partition that is known a priori by the population of users, the transmitting the allocation table partitions comprising:
transmitting the first partition in a first plurality of non-contiguous sets of subcarriers in a first portion of a frequency bandwidth, the first portion comprising a fixed number of a set of non-contiguous sub-carriers, wherein the first partition is located at a predetermined time-frequency resource position known to the population of users of a physical shared channel sub-frame in which the allocation table partitions are transmitted, wherein the first partition contains no user equipment-specific entries and the first partition comprises information about a length of the at least one second partition; and transmitting the at least one second partition in a second plurality of non-contiguous sets of subcarriers in a second portion of the frequency bandwidth, wherein the at least one second partition contains user equipment-specific entries.

21. The apparatus of claim 20, wherein the first partition comprises information about resource location of the at least one second partition.

22. The apparatus of claim 20, wherein the first partition comprises information about a modulation used in the at least one second partition.

23. The apparatus of claim 20, wherein the first partition comprises information about coding used in the at least one second partition.

24. The apparatus of claim 20, wherein for the case where the processor partitions the allocation table into at least two second partitions, the transmitter is adapted to transmit the at least two second partitions using at least different transmit power.

25. The apparatus of claim 20, wherein the transmitter is adapted to transmit different information elements of one of the partitions using at least different transmit power.

26. The apparatus of claim 20, wherein the transmitter is adapted to transmit different information elements within the second partition using different outer repetition coding.

27. The apparatus of claim 20, wherein the transmitter is adapted to transmit the first partition at a power higher than a transmit power of any of the at least one second partitions of the allocation table.

28. The apparatus of claim 20, wherein the transport format known a priori by the population of users comprises a first transport format, and wherein the transmitter is adapted to transmit the at least one second partition using a second transport format.

29. The apparatus of claim 20, wherein the processor is adapted to include in each allocation table a bit field of fixed length indicating a number of uplink only entries and a number of downlink only entries in the allocation table.

30. The apparatus of claim 20, wherein the transmitter is adapted to map at least one of the first and second partitions to a portion of frequency bandwidth comprising a fixed number of a set of sub-carriers.

31. The apparatus of claim 30, wherein the transmitter is adapted to transmit the first partition over the first plurality of non-contiguous sets of subcarriers at a first transmit power and to transmit the second partition over the second plurality of non-contiguous sets of subcarriers at a second transmit power different from the first transmit power.

32. An integrated circuit comprising:
first circuitry adapted, for each of multiple resource allocations by a network node, to partition an allocation table into a first, fixed length partition and into at least one second, variable length partition
second circuitry adapted to transmit the allocation table partitions to a population of users using a transport format at least for the first partition that is known a priori by the population of users, the transmitting the allocation table partitions comprising:
transmitting the first partition in a first plurality of non-contiguous sets of subcarriers in a first portion of a frequency bandwidth, the first portion comprising a fixed number of a set of non-contiguous sub-carriers, wherein the first partition is located at a predetermined time-frequency resource position known to the population of users of a physical shared channel sub-frame in which the allocation table partitions are transmitted wherein the first partition contains no user equipment-specific entries and the first partition comprises information about a length of the at least one second partition; and transmitting the at least one second partition in a second plurality of non-contiguous sets of subcarriers in a second portion of the frequency bandwidth, wherein the at least one second partition contains user equipment-specific entries.

33. The integrated circuit of claim 32, wherein the first partition comprises information about resource location of the at least one second partition.

34. The integrated circuit of claim 32, wherein the first partition comprises information about at least one of modulation and coding of the at least one second partition.

35. The integrated circuit of claim 32, wherein the second circuitry is adapted to transmit the first partition at a power higher than a transmit power of any of the at least one second partitions of the allocation table.

36. The integrated circuit of claim 32, wherein the second circuitry is adapted to transmit different information elements of one of the second partitions using at least different transmit power.

37. An apparatus comprising:
a receiver adapted to receive a partitioned allocation table, wherein a fixed length first partition of the allocation table is located at a predetermined time-frequency resource position known to the apparatus of a physical shared channel sub-frame in which the first partition and at least one variable length second partition of the allocation table is received, wherein the first partition contains no user equipment-specific entries; and
a processor adapted to determine from the first partition a length of the at least one second partition, to decode the at least one second partition using the determined length, to process the fixed length first partition of the allocation table in a known channel coding block, the first partition mapped to a first plurality of non-contiguous sets of subcarriers in the coding block, and to process the at least one variable length second partition of the allocation table, the at least one second partition containing user equipment-specific entries and mapped to a second plurality of non-contiguous sets of subcarriers, to determine that the variable length second partition is correctly received and to determine from the allocation table that an allocation of resources is completely received, wherein the at least one second partition is processed in response to the user equipment-specific entries comprising one or more entries for the apparatus.

38. The method of claim 1, wherein each set of the first plurality of non-contiguous set of subcarriers comprises one or more subcarriers.

39. The method of claim 38, wherein each set of the second plurality of non-contiguous set of subcarriers comprises two or more subcarriers.

40. The method of claim 12, wherein each set of the first plurality of non-contiguous set of subcarriers comprises one or more subcarriers.

41. The method of claim 40, wherein each set of the second plurality of non-contiguous set of subcarriers comprises two or more subcarriers.

42. The method of claim 20, wherein each set of the first plurality of non-contiguous set of subcarriers comprises one or more subcarriers.

43. The method of claim 42, wherein each set of the second plurality of non-contiguous set of subcarriers comprises two or more subcarriers.

44. The method of claim 1, wherein all user equipment allocation entries are carried in the second partition.

45. The method of claim 11, wherein there are multiple second partitions, each comprising different sets of the second plurality of non-contiguous sets of subcarriers, and transmitting further comprises transmitting each set of the second plurality of non-contiguous sets of subcarrier at different powers.

46. The method of claim 44, wherein the first, fixed length partition only carries a header field and paging indications for users.

47. The method of claim 46, wherein the first, fixed length partition further comprises a random access channel response for one of the users.

48. The method of claim 9, wherein transmitting comprises transmitting the first partition using physical resources of only high transport power profiles for physical resource partitioning of a control channel over which the first and second partitions are transmitted.

* * * * *

UNITED STATES PATENT AND TRADEMARK OFFICE
CERTIFICATE OF CORRECTION

PATENT NO. : 10,225,856 B2  
APPLICATION NO. : 11/801965  
DATED : March 5, 2019  
INVENTOR(S) : Kahtava et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2353 days.

Signed and Sealed this  
Second Day of June, 2020

Andrei Iancu  
*Director of the United States Patent and Trademark Office*